(12) United States Patent
Rajabali et al.

(10) Patent No.: US 7,279,062 B2
(45) Date of Patent: Oct. 9, 2007

(54) METHOD FOR THE PRODUCTION OF A LAMINATE WITH MUTUALLY OFFSET LAYERS

(75) Inventors: Abdoel Faziel Rajabali, Alphen Aan de Rijn (NL); Willem Jan Nicolaas ter Steeg, Pulheim (NL)

(73) Assignee: Stork Fokker AESP B.V. (NL)

( * ) Notice: Subject to any disclaimer, the term of this patent is extended or adjusted under 35 U.S.C. 154(b) by 0 days.

(21) Appl. No.: 10/912,355

(22) Filed: Aug. 5, 2004

(65) Prior Publication Data

US 2005/0037223 A1    Feb. 17, 2005

(30) Foreign Application Priority Data

Aug. 8, 2003   (NL) .................................. 1024077

(51) Int. Cl.
*B32B 37/26* (2006.01)
(52) U.S. Cl. .................. 156/245; 156/295; 156/307.1; 156/307.7; 156/304.5; 156/323
(58) Field of Classification Search ................ 428/573, 428/615; 156/212, 245, 309.6, 295, 307.1, 156/307.7, 304.5, 323, 288; 244/119, 117 R, 244/120, 123.1, 126
See application file for complete search history.

(56) References Cited

U.S. PATENT DOCUMENTS 5,116,440 A * 5/1992 Takeguchi et al. ............ 156/90
5,160,771 A   11/1992 Lambing
5,478,420 A * 12/1995 Gauci et al. ............. 156/89.17
6,090,237 A    7/2000 Reynolds
2002/0076522 A1* 6/2002 Hsieh et al. ................ 428/113

FOREIGN PATENT DOCUMENTS

WO        WO9853989        12/1998

* cited by examiner

*Primary Examiner*—Jessica Ward
(74) *Attorney, Agent, or Firm*—Cooper & Dunham LLP

(57) ABSTRACT

A method for the production under elevated pressure and temperature of a laminate (1, 1') consisting of a pack with alternating metal layers (2) and plastic bonding layers (3), comprises stacking a first series (8) of layers on top of one another in a mould, then stacking at least a second series (7, 7') of layers on top of the first series (8) of layers, with the formation of the pack of layers such that at at least one edge of the pack at least one (7, 7') of the series is stepped back with respect to the other series (8), an auxiliary tool (12) being placed alongside the stepped-back series (7, 7') and on the other, non-stepped-back series (8) and a gap (13) being formed between the stepped-back series (7, 7') and that side (14) of the auxiliary tool (12) facing said series, raising the temperature and the pressure on the pack and the auxiliary (12) tool such that the binder in the plastic bonding layers (3) is made to flow and some of the binder present in the stepped-back series (7, 7') collects in said gap (13).

3 Claims, 3 Drawing Sheets

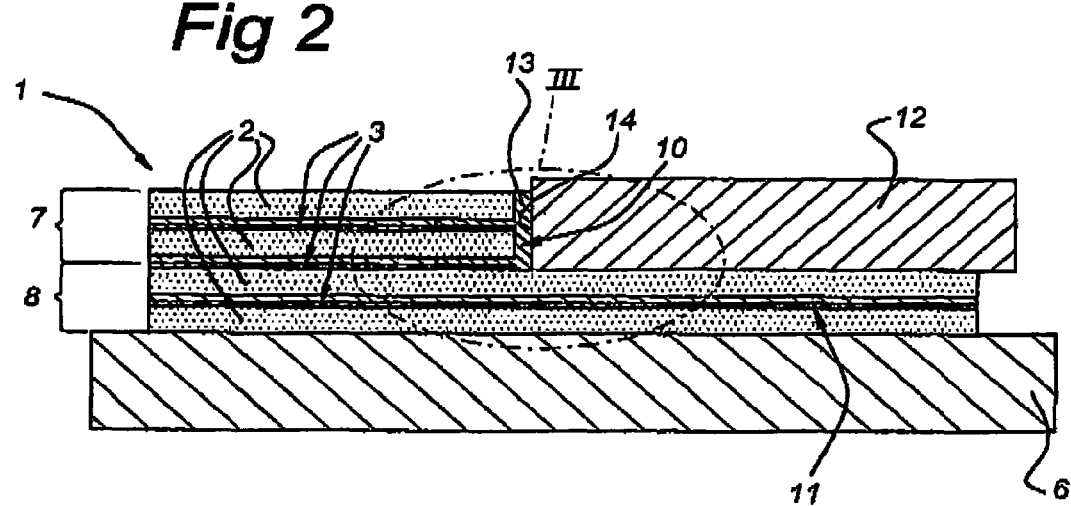
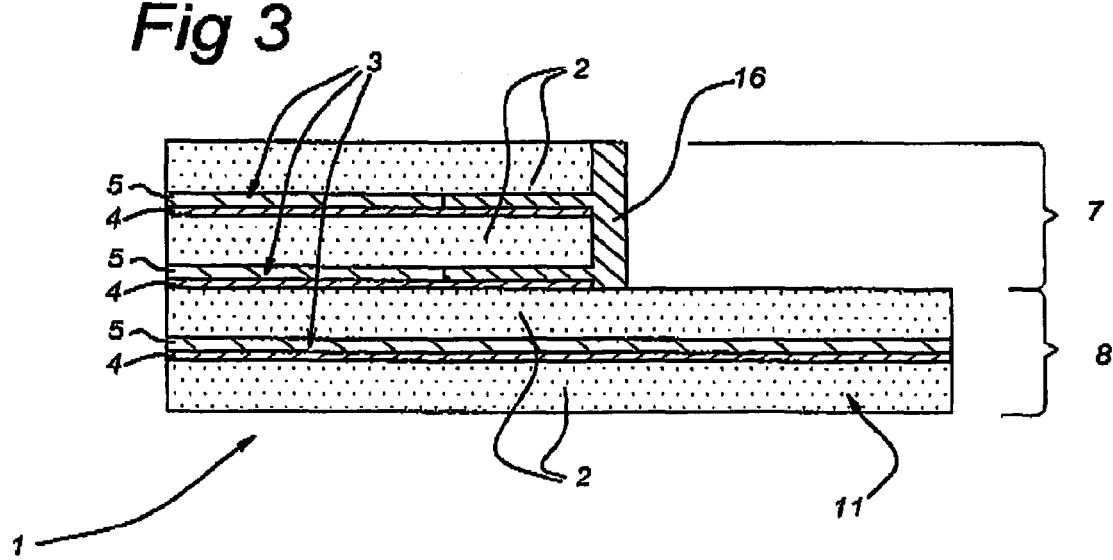

METHOD FOR THE PRODUCTION OF A LAMINATE WITH MUTUALLY OFFSET LAYERS

BACKGROUND OF THE INVENTION

The invention relates to the production of laminates that can be attached to one another by means of edge regions made in the form of steps. A portion of the layers of which the laminate consists then protrudes with respect to the other layers, such that the protruding layers form the actual joining region. The advantage of such a join is that this is relatively smooth, which is advantageous especially from the standpoint of aerodynamics.

However, the production of such laminates with edges made in the form of steps presents problems. For instance, in the case of, for example, plastic bonding layers that contain fibres, the fibres can emerge on the outside under the influence of the elevated pressure under which the laminate is produced. This is not desirable because undesired phenomena can then arise in the finished product, such as the penetration of moisture into the fibre layer, corrosion and the like. The life of the laminate can be seriously limited as a result.

In the aviation industry such joins occur in both the longitudinal direction and in the circumferential direction of the aircraft body. It is desirable to keep the body as smooth as possible in the longitudinal direction and for this reason the joins between the panels consisting of laminate are frequently made with step-shaped edges. In the circumferential direction of the body such joins are also frequently used with strips of different thickness. Such joins can also be used when coupling together strips made up of metal laminates, which may or may not be fibre-reinforced and may or may not have different thicknesses, which are usually used in panel couplings in the circumferential direction of an aircraft body.

SUMMARY OF THE INVENTION

The aim of the invention is to provide a method for the production of a laminate that is suitable for use with such joins and that does not have the abovementioned disadvantages. Said aim is achieved by means of a method for the production under elevated pressure and temperature of a laminate consisting of a pack with alternating metal layers and plastic bonding layers, comprising stacking a first series of layers on top of one another in a mould, then stacking at least a second series of layers on top of the first series of layers, with the formation of the pack of layers such that at at least one edge of the pack at least one of the series is stepped back with respect to the other series, an auxiliary tool being placed alongside the stepped-back series and on the other, non-stepped-back series and a gap being formed between the stepped-back series and that side of the auxiliary tool facing said series, raising the temperature and the pressure on the pack and the auxiliary tool such that the binder in the plastic bonding layers is made to flow and some of the binder present in the stepped-back series collects in said gap.

With the method according to the invention it is ensured that the edge boundary of the series of layers that is indented has a smooth finish as a consequence of the amount of binder that has run into the gap between the indented layers and the tool. Furthermore, the edge of the tool facing these layers acts as a forming mould for said edge boundary, such that the desired shape thereof can be ensured by selection of the shape of said edge of the tool. Furthermore, any fibres that have become detached will be embedded well in the binder that has flowed into the gap.

As is known the fibres in the fibre-reinforced plastic layers can have different orientations. If at least one of the plastic bonding layers contains fibre layers which have an orientation parallel to the edge of the pack, the method according to the invention comprises making said fibre layer indented with respect to the metal layers located next to it. In said indented position the fibres have hardly any opportunity to emerge between the metal layers, as a result of which the quality of the laminate is further improved.

If, however, at least one of the plastic bonding layers contains fibres which have an orientation perpendicular to said edge, said fibres can be allowed to continue to essentially in line with the adjacent metal layers.

The invention furthermore relates to a laminate comprising a first series of layers, a second series of layers on the first series of layers with the formation of a pack such that at at least one edge of the pack one of the series of layers is indented with respect to the other series, the edge of the stepped-back series of layers being covered by a layer of binder.

BRIEF DESCRIPTION OF THE DRAWINGS

The invention will be explained in more detail below with reference to the laminates shown in the figures.

FIG. 2 shows a second possible production method.

FIG. 3 shows one embodiment of the laminate according to the invention.

DETAILED DESCRIPTION OF THE INVENTION

Figure 1:
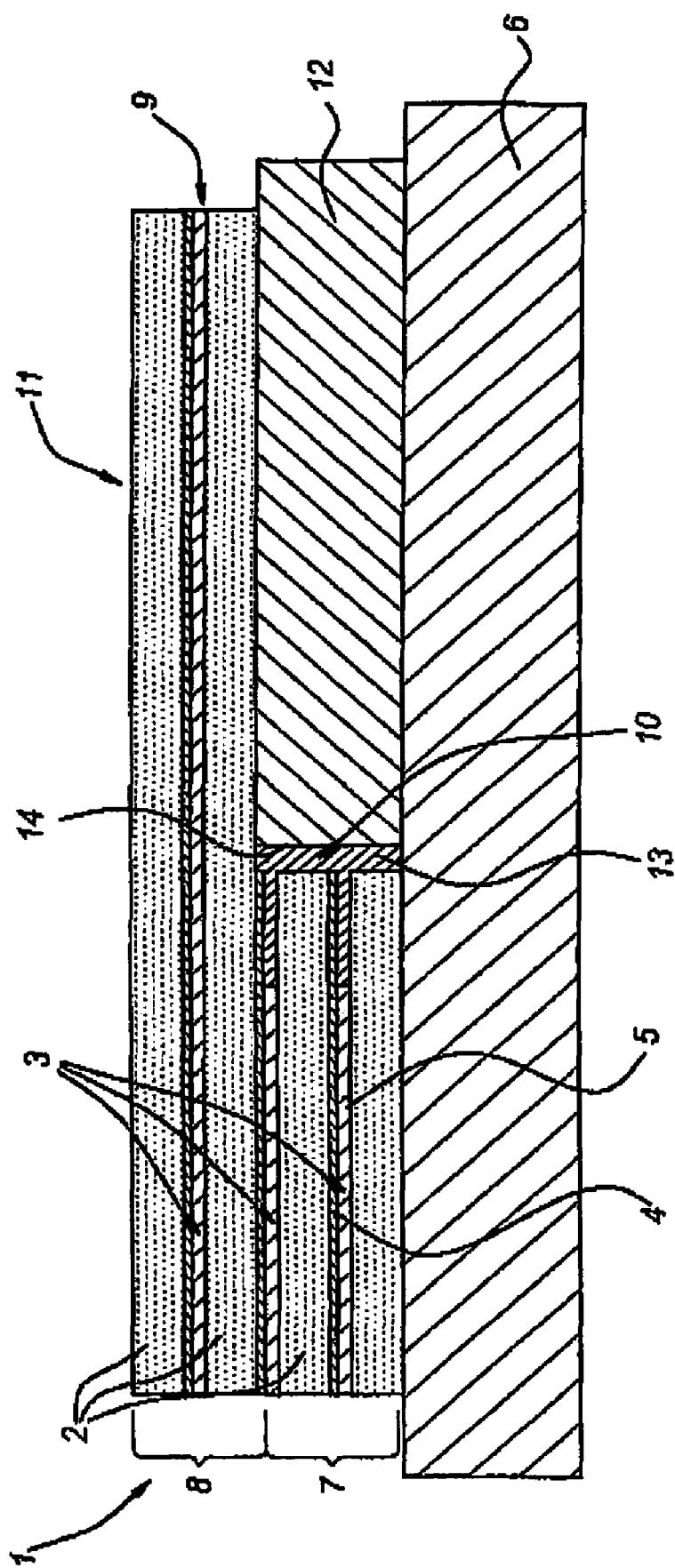
FIG. 1 shows the production of the laminate according to the invention in accordance with a first possibility.

In FIG. 1 a laminate is shown that is indicated in its entirety by 1 and consists of metal layers 2 and fibre-reinforced bonding layers 3 incorporated between them. These fibre reinforced bonding layers 3 each consist of, in turn, two layers 4, 5, but this number is of no further importance for the invention.

When carrying out the method according to the invention, a first series of layers 7 is stacked on the forming mould 6. A second series of layers 8 is then stacked on top of this. The edge 9 of the second series of layers 8 protrudes with respect to the edge 10 of the first series of layers 7. The finished laminate 1 produced in this way can be joined by the protruding portion 11, which borders on the edge 9, with, for example, a corresponding protruding portion 11 of another laminate.

When producing such a laminate problems can arise in that the fibres become detached from the fibre layers at the edge 10. This can constitute a problem especially in the case of fibres that run parallel to the edge 10. The layer 5 contains such fibres and therefore terminates some distance before the edge 10. The layer 4, on the other hand, contains fibres that run perpendicularly to the edge 10. There is no risk of detachment in the case of these fibres, so said layer does continue as far as the edge 10.

The auxiliary tool 12 is used in the production of the laminate, which, as is known, takes place under elevated pressure and temperature. This auxiliary tool is positioned with respect to the first series of layers 7 such that a gap 13 remains between the edge 10 and the edge 14 of the auxiliary tool 12.

As a consequence of the elevated temperature and pressure, some of the binder with which the fibre layers 4, 5 have been impregnated runs out of the gap between the metal layers 2 and passes into the gap 13 that has remained between said series of layers 7 and the auxiliary tool 12. The edge 10 of the series of layers 7 is then covered with a layer of binder 16.

As a consequence of this the end of the series of layers 7 acquires a straight, smooth boundary 16 that is defined by the end edge 14 of the tool 12. Any fibres that have become detached are embedded in the amount of binder 16 that is at that end of the series of layers 7.

In the representation in FIG. 2 it is shown that the series of layers 8 can also be placed with the protruding portion directly on the forming mould, whilst the series of layers 7 that is stepped back is located on top of said series of layers 8. The forming tool 12 is then also located on the protruding portion of the series of layers 8. Binder that has become fluid under the influence of heat then collects under pressure in the gap 13 between the end 10 of the series of layers 7 and the edge 14 of the auxiliary tool 12.

The laminate obtained is shown in FIG. 3, in which the amount of binder 16 that now forms the end limit of the series of layers 7 is shown.

Figure 4:
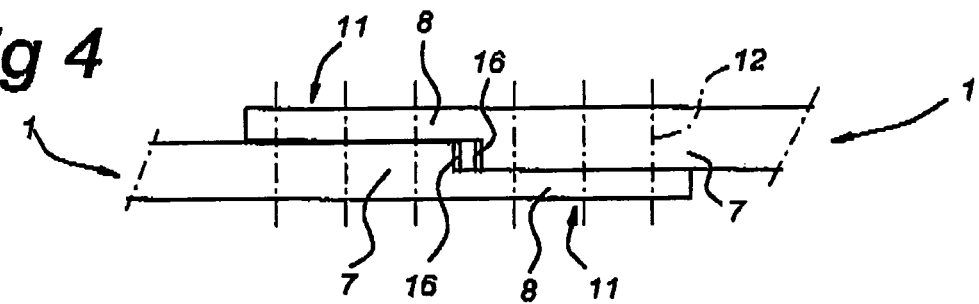
FIGS. 4 and 5 show two possible assemblies obtained with the laminate according to FIG. 3.

FIG. 4 shows a first assembly of two laminates according to FIG. 3. The stepped-back layers 7, in particular the boundaries formed from binder 16 thereof, are directly opposite one another, whilst in each case one non-stepped-back series 8 of the one laminate 1 lies over the stepped-back series 7 of the other laminate 1. The laminates 1 can be attached to one another at the location of the holes shown diagrammatically by an axis 12 by means of, for example, rivets or bolted joints.

Figure 5:
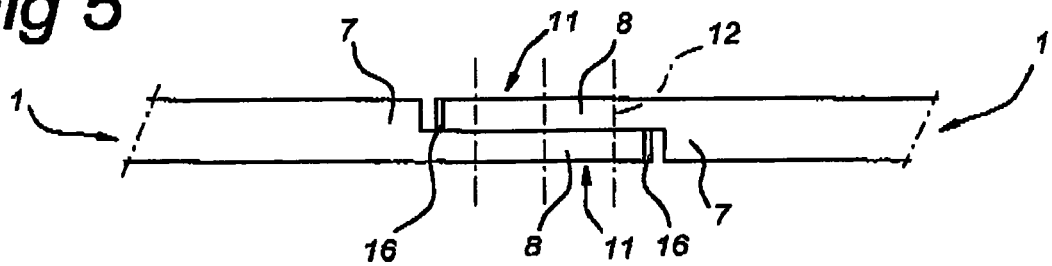

In the variant in FIG. 5 the assembly is made flat in that in each case one non-stepped-back series 8 of the one laminate 1 is opposite the stepped-back series 7 of the other laminate 1.

Figure 6:
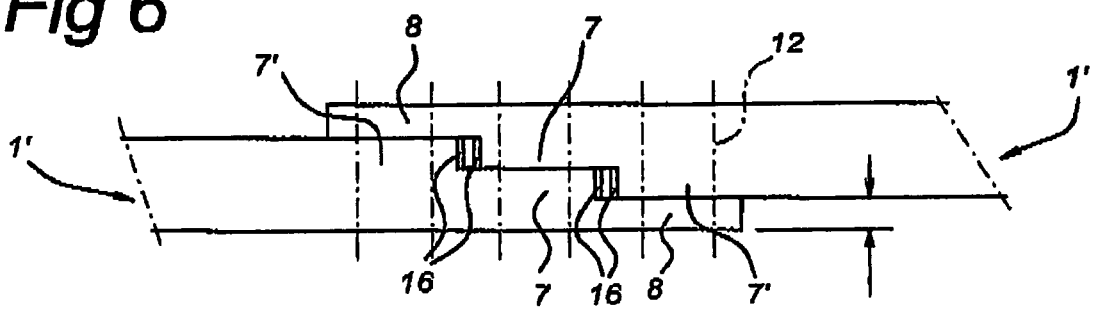
FIGS. 6 and 7 show two assemblies of a laminate with two stepped-back series.
Figure 7:
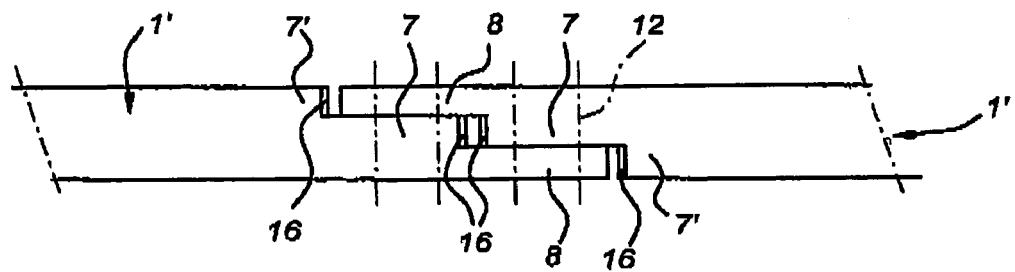
Figure 8:
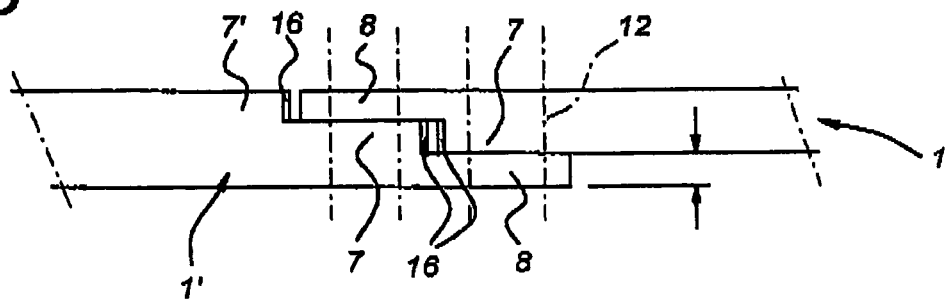
FIG. 8 shows an assembly of a laminate with a stepped-back series and a laminate with two stepped-back series.

The variants in FIGS. 6, 7 and 8 each contain a laminate 1' with two stepped-back series 7, 7'. The series 7 is stepped back with respect to the non-stepped-back series 8, whilst the stepped-back series 7', in turn is stepped back with respect to the stepped-back series 7.

In the embodiment in FIG. 6 in each case one non-stepped-back series 8 lies over the second stepped-back series 7' of the other laminate 1'.

In the variant in FIG. 7 the non-stepped-back series 8 of the one laminate 1' is in each case opposite the second stepped-back series 7' of the other laminate. With this arrangement the first stepped-back series 7 are opposite one another. A smooth assembly is obtained in this way.

In the variant in FIG. 8 a laminate 1 with a stepped-back series 7 and a second laminate 1' with two stepped-back series 7, 7' are used. The non-stepped-back series 8 of the first laminate 1 is opposite the second stepped-back series 7' of the second laminate 1'. The stepped-back series 7 are opposite one another. An assembly that is smooth on one side is obtained by this means.

What is claimed is:

1. A method for the production under elevated pressure and temperature of a laminate consisting of a pack with alternating metal layers and plastic bonding layers, wherein said plastic bonding layers contain fiber layers and a binder, comprising stacking a first series of layers on top of one another in a mold, then stacking at least a second series of layers on top of the first series of layers, forming the pack of layers such that at least one edge of the pack of at least one of the series is stepped back with respect to the other series, placing an auxiliary tool alongside the stepped-back series and on the other, non stepped-back series to form a gap between the stepped-back series and a side of the auxiliary tool facing said stepped-back series, raising the temperature and the pressure on the pack and the auxiliary tool such that said binder in the plastic bonding layers is made to flow and some of the binder present in the stepped-back series collects in said gap, sealing the fiber layers so as to prevent the penetration of moisture into the fibre layer and forming a substantially un-rounded edge, wherein the laminate is specifically used to form an aircraft body panel.

2. The method according to claim 1, wherein at least one of the plastic bonding layers of the stepped-back series contains fibre layers which have an orientation parallel to an edge of said stepped-back series, comprising making said fibre layer indented with respect to the metal layers located next to it.

3. The method according to claim 1, wherein at least one of the plastic bonding layers of the stepped-back series contains fibre layers which have an orientation perpendicular to an edge of said stepped-back series, such that fibres of said fibre layers terminate essentially in line with the adjacent metal layers.

* * * * *